(No Model.)　　　　　　　　J. F. DORNFELD.　　　　5 Sheets—Sheet 2.
MALT STIRRER.

No. 532,543.　　　　　　　　　　　　Patented Jan. 15, 1895.

Witnesses.

Inventor.
John F. Dornfeld
By Benedict & Morsell
Attorneys.

(No Model.)  5 Sheets—Sheet 3.

J. F. DORNFELD.
MALT STIRRER.

No. 532,543.  Patented Jan. 15, 1895.

Witnesses.
C. H. Keeney
Anna V. Faust

Inventor.
John F. Dornfeld,
By Benedict and Morsell
Attorneys.

THE NORRIS PETERS CO., PHOTO-LITHO., WASHINGTON, D. C.

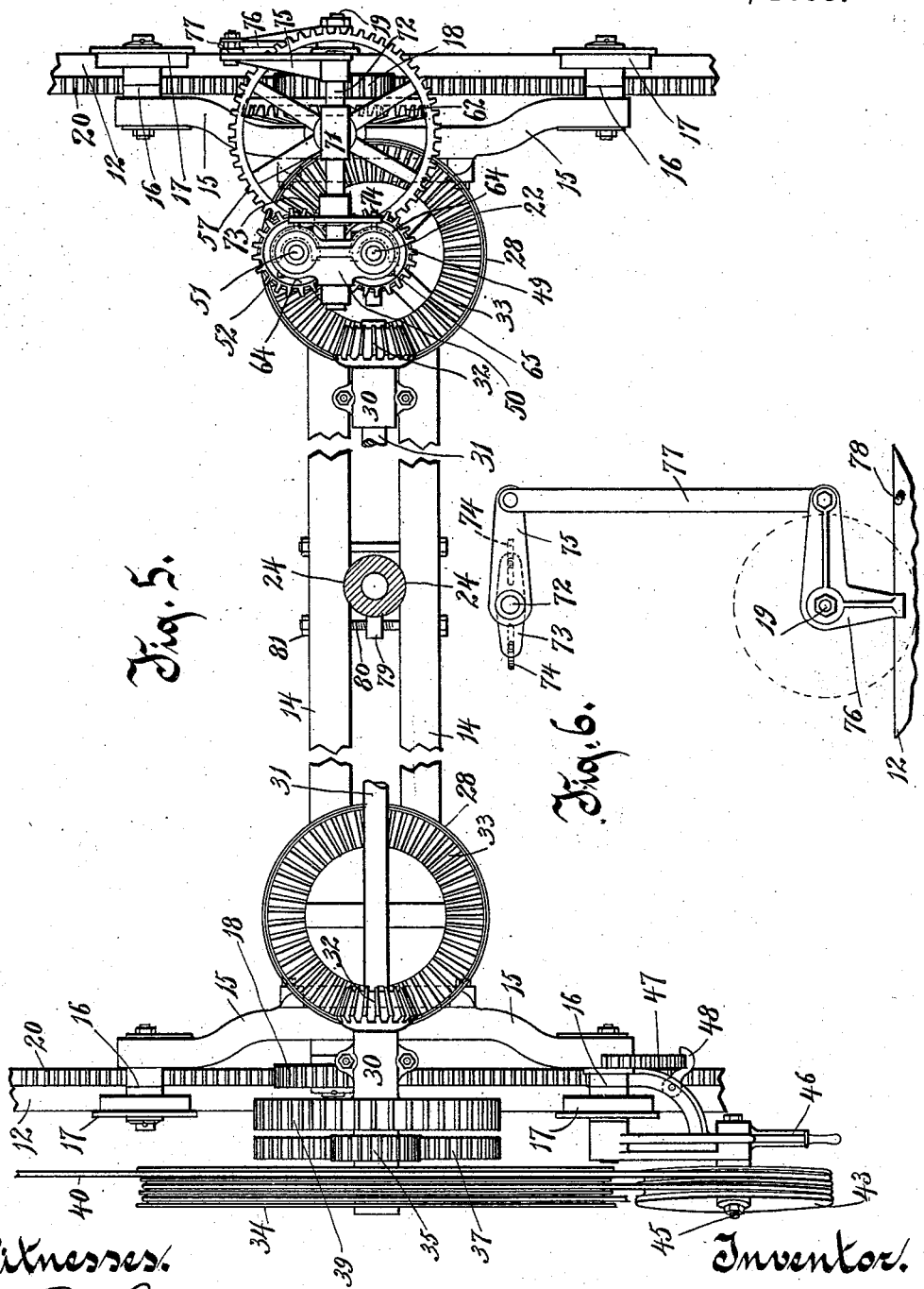

(No Model.) 5 Sheets—Sheet 5.
J. F. DORNFELD.
MALT STIRRER.
No. 532,543. Patented Jan. 15, 1895.
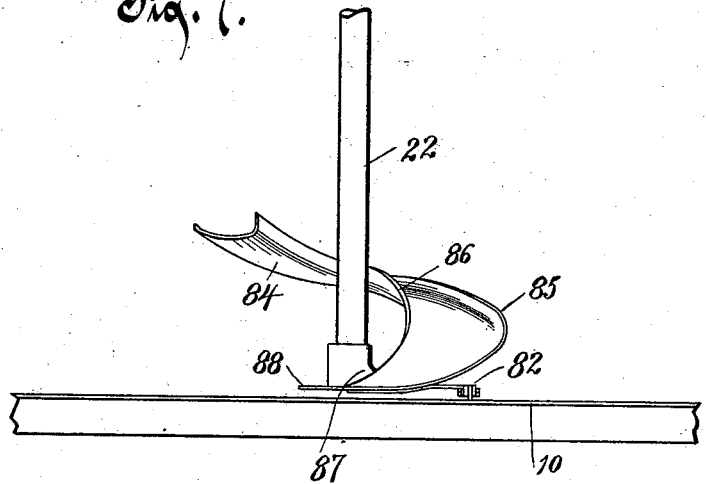
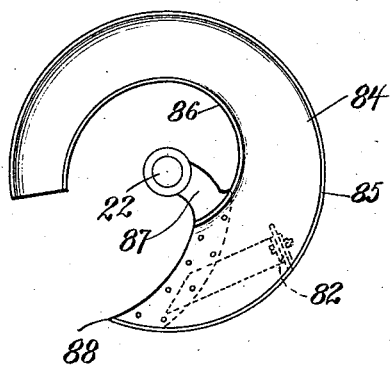
Witnesses. Inventor.
John F. Dornfeld
By Benedict & Morsell
Attorneys.

United States Patent Office.

JOHN F. DORNFELD, OF CHICAGO, ILLINOIS.

MALT-STIRRER.

SPECIFICATION forming part of Letters Patent No. 532,543, dated January 15, 1895.

Application filed April 9, 1894. Serial No. 506,848. (No model.)

*To all whom it may concern:*

Be it known that I, JOHN F. DORNFELD, of Chicago, in the county of Cook and State of Illinois, have invented a new and useful Improvement in Malt Turning or Stirring Machines, of which the following is a description, reference being had to the accompanying drawings, which are a part of this specification.

My invention has relation to improvements in malt turning or stirring machines.

The object of the invention is to provide a strong and durable apparatus, which is absolutely simple both in construction and operation.

The invention comprehends among its novel features improved driving mechanism, improved propelling and reversing mechanism, and an improved malt stirring plow or helix.

The invention consists of the devices and parts, or their equivalents, as hereinafter more fully described and claimed.

Figure 1:
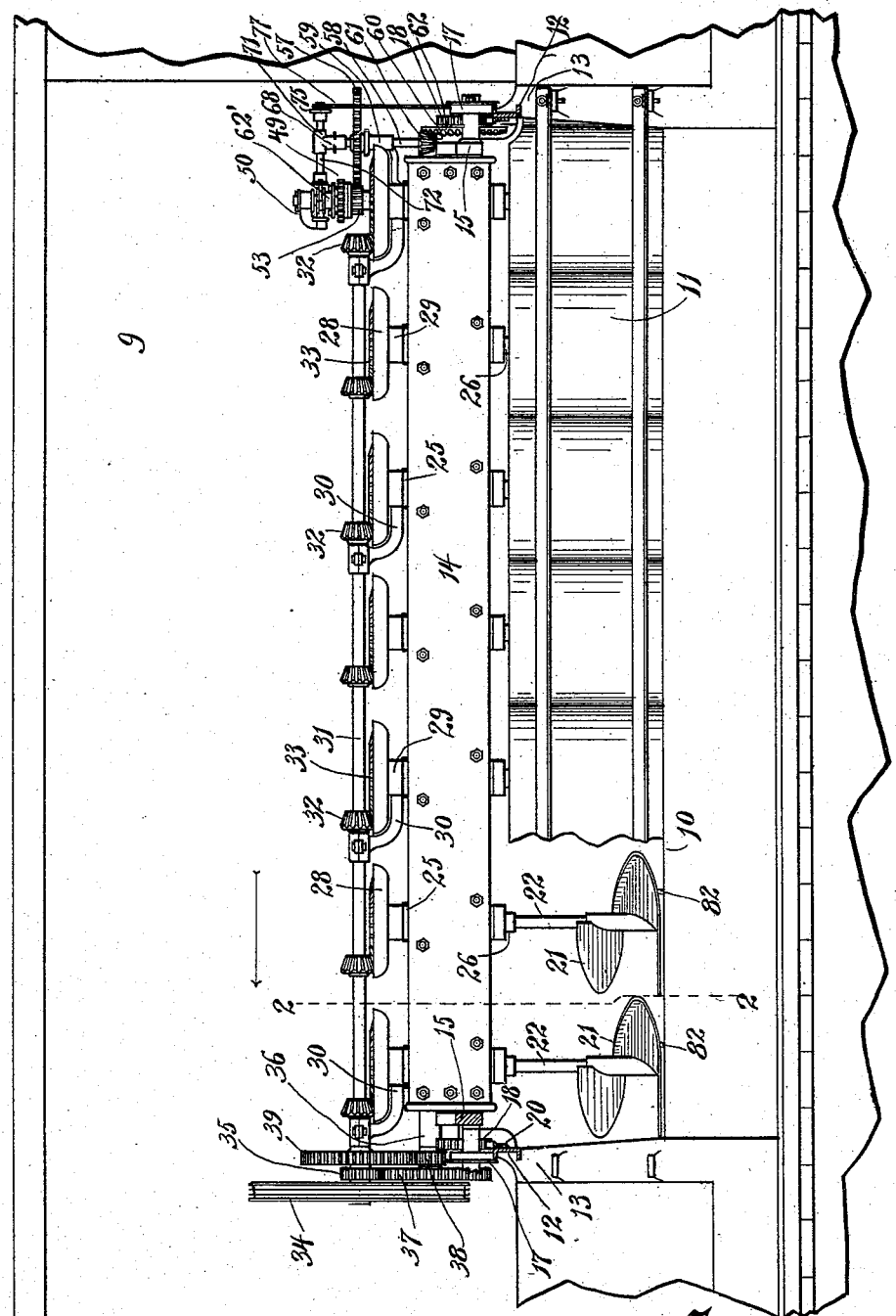
Figure 2:
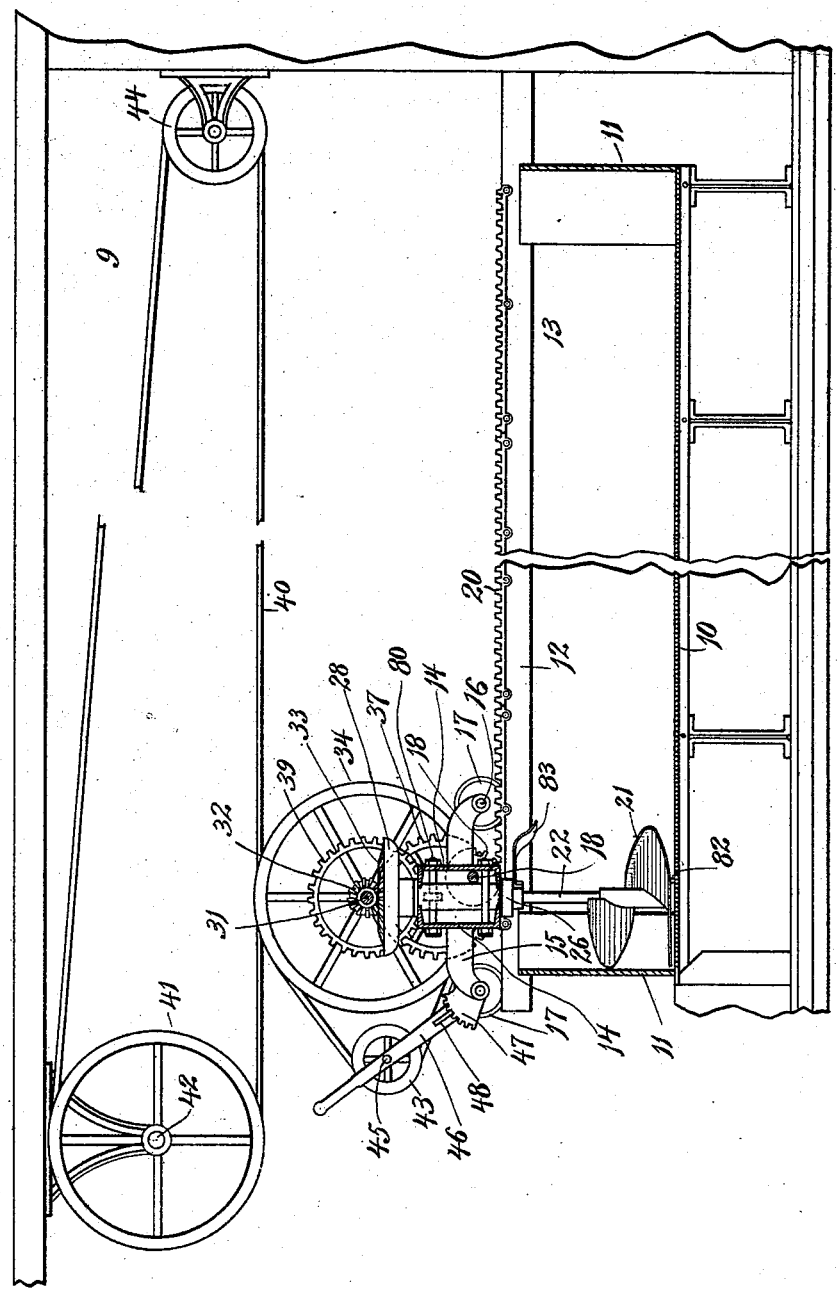
Figure 3:
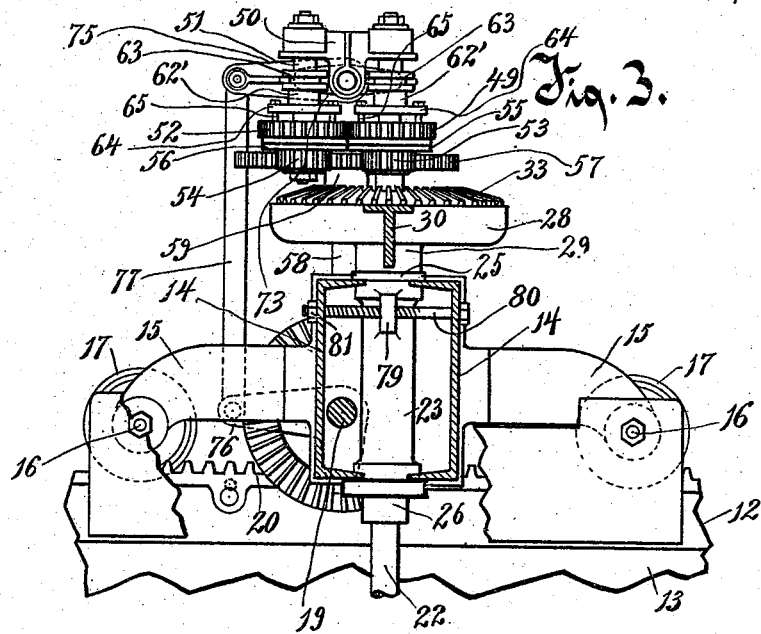
Figure 4:
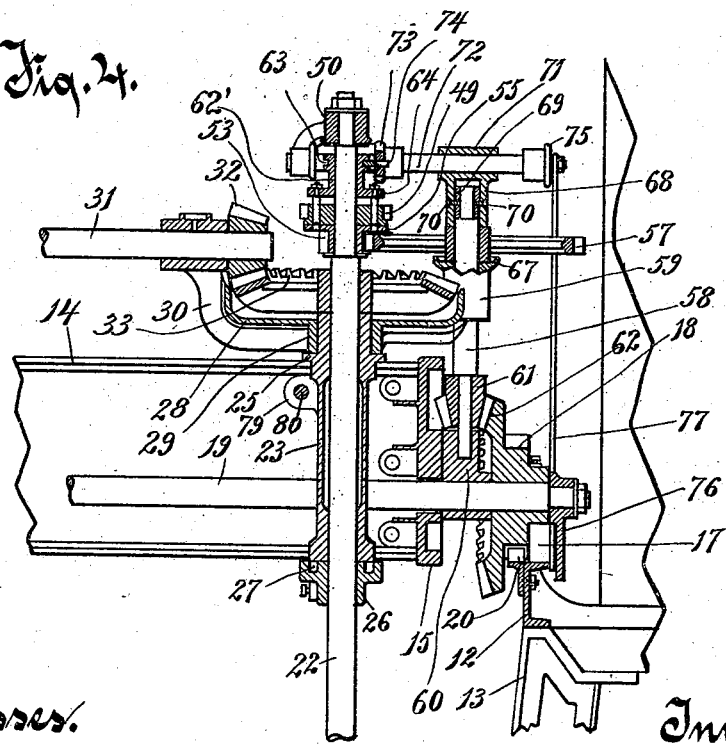

In the accompanying drawings, Figure 1, is a front view or elevation with a part broken away. Fig. 2, is a vertical transverse section on the line 2—2 of Fig. 1, looking in the direction of the arrow. Fig. 3, is a cross section of the opposite end of the machine or the end where the propelling and reversing mechanism is located. Fig. 4, is a longitudinal section through the propelling and reversing end of the machine. Fig. 5, is a fragmentary plan view of the complete device. Fig. 6, is a detail view of a portion of the reversing mechanism. Fig. 7, is an elevation of an improved form of malt stirring plow or helix, and Fig. 8, is a plan view thereof.

Referring to the drawings, the numeral 9 (Figs. 1 and 2) indicates the malting room, 10 the malting floor thereof, and 11 the end walls of the malting floor. A track, consisting of rails 12, 12, is fixed horizontally on the tops of walls 13.

A carriage is located above the malting floor, and extends transversely across the room. The sides of this carriage are formed of two channeled beams 14, 14, (Fig. 3) the top and bottom flanges of which extend inward toward each other. At opposite ends of the carriage are formed the arms 15, 15, (Fig. 5) from which project fixed axles 16, 16, upon which fixed axles wheels 17, 17 are mounted and travel on the rails 12. Gear wheels 18, 18 fixed on a shaft 19 journaled in the carriage mesh with racks 20, 20, fixed to the tracks 12. By this means the carriage is capable of being driven slowly back and forth across the room over the malting floor.

For elevating and stirring the malt on the malting floor 10, there is a series of spiral shovels 21, Fig. 2 fixed on vertically-disposed shafts 22. These shovels are located along the carriage at such distances apart, and in such manner, as to sweep and raise all the malt over the malting floor during the progress of the carriage across the floor from one extremity to the other. The shafts 22 are surrounded medially by sleeves 23, Fig. 3, the shafts passing loosely therethrough so as to rotate freely therein. The edges of the flanges of the channels 14, 14 have small circular segments cut out, at opposite points, for the accommodation of the sleeves 23, as indicated by the numerals 24, 24 in Fig. 4, and which sleeves act to separate and keep the channels the required distance apart and thrust the same laterally. Immediately above the top flanges of the channels, each sleeve is provided with an annular flange 25 Fig. 4 which overlaps the segmental cuts and rests on the flanges, thereby supporting the sleeve. On each shaft 22, and fitting against the end of the sleeve 23, is a set collar 26. This set collar forms a bearing against the sleeve, and prevents all up and down movements of the shaft 22. This set collar also has a recess or cavity 27 therein to catch the oil.

The numeral 28 (Fig. 3) indicates drip cups. Each cup is provided with a depending hub 29 which tightly surrounds the sleeve 23, and rests on the annular flange 25 of said sleeve. Extending from the depending hub of each alternate drip cup is an angular arm 30, said arm formed at its upper end with a bearing. Through these bearings of the arms 30 passes a shaft 31, said shaft carrying a series of beveled pinions 32, Fig. 5 which mesh with a series of beveled gears 33, each gear, respectively, being mounted rigidly to the upper end of a shaft 22, for imparting rotation thereto.

Mounted on one extremity of the shaft 31 is a sheave wheel 34, Fig. 1, to which is cast, or otherwise fastened, a small spur wheel 35. The sheave wheel 34, and its attached spur wheel, are mounted to rotate freely on the shaft 31. Projecting from one of the carriage arms 15 is a pin or arbor 36. A spur wheel 37 and a small pinion 38, cast, or otherwise suitably secured, together, are mounted upon the pin or arbor 36. The wheel 37 meshes with a spur wheel 35, while the pinion 38 meshes with the spur wheel 39, keyed, or otherwise secured, to the shaft 31. This arrangement completes the transmission of power from the rope sheave 34 to the shaft 31, the arrangement of the gears being such that a reduction of speed from said rope sheave to the shaft 31 is secured, and a further reduction of speed from the shaft 31 to the shafts 22, by means of the intermeshing gears 32 and 33. By providing this reducing mechanism, I am enabled to rotate the plow shafts at the desired slow rate of speed, by the use of a small rope operating the sheave 34. The small rope is required to be actuated quite rapidly in order to give sufficient power to turn the sheave 34 and shaft 31, and if this rotation were imparted directly to the plow shafts, said shafts would be rotated too rapidly for the purposes of my invention, and hence the necessity for the introduction of reducing mechanism. Of course, the sheave 34 could be rotated slowly, and this slow rotation imparted directly to the plow shafts by the use of a large rope in connection with the sheave 34. In that case, however, it would be necessary to make the sheave 34 very heavy, and other portions of the frame of the machine correspondingly heavy.

For rotating the wheel 34 an endless driven cable 40, located above and preferably in the direction of the travel of the carriage over the malting floor, is provided. This cable runs around a wheel 41 mounted on a driven shaft 42. The cable is extended from the wheel 41 to the sheave 34, and is then extended back and forth around said sheave and a tightening sheave 43, being wound therearound several times, finally leaving sheave 34, and passed around a pulley 44, from which it extends to the wheel 41. The tightener sheave 43 is mounted in a tilted or inclined position on a pin 45 extending from an arm 46, which arm is formed into two branches, which turn loosely on one of the fixed axles 16 projecting from the carriage arm 15, the wheel 17 of the carriage being mounted on the axle between these branches. This carriage arm 15 is also provided with a toothed segment 47, by which the arm 46 is held in any position by a dog or catch 48.

The plow shaft 22 at the end of the carriage opposite to the end at which the driving mechanism is located, has its upper end extended, and on this extended end is keyed a spur wheel 49. At the extreme upper end of this shaft 22 is mounted loosely one end of a yoke 50. From the opposite end of this yoke depends a short shaft 51, which shaft is fixed in the yoke. On this shaft 51 is mounted loosely a spur wheel 52, engaging with the spur wheel 49 fast on the extended end of the shaft 22. Directly under the wheels 49 and 52 are loosely mounted spur wheels 53 and 54, respectively, said spur wheels having apertured flanges 55 and 56, respectively, cast to their upper ends. These spur wheels 53 and 54 both engage with a larger spur wheel 57, which is fixed on a vertical shaft 58. This shaft is journaled at its upper end in a bearing 59 cast or integral with the adjacent drip cup 28, and at its lower end is journaled in a suitable bearing 60 provided in the carriage arm 15. The lower extremity of this shaft carries a small beveled pinion 61, which meshes with a beveled mate 62 fixed on the end of the shaft 19, and cast or integral with the gear wheel 18, if preferred.

Sleeves 62' 62' are loosely mounted on the respective shafts 22 and 51. The upper ends of these sleeves are provided with annular grooves 63, 63 while the lower ends are formed with annular flanges 64, 64 from which depend pins 65, passing through holes in the wheels 49 and 52. The hub of the large wheel 57 mounted upon vertical shaft 58 rests upon the bearing 59, said bearing formed at its upper end with a cavity or recess 67 for catching the lubricating oil. Surrounding the upper end of the vertical shaft 58, and resting upon the upper edge of the hub of wheel 57, is a tubular arm 68. Interposed between this arm and the shaft, and surrounding the shaft, is a wearing sleeve 69, to which the tubular arm is secured by means of screws 70, 70. The upper end of the tubular arm is provided with a transverse horizontally apertured head 71, forming a bearing for a shaft 72. This shaft carries on its inner end rigidly an arm 73 which is provided at opposite ends with forks 74, 74, which forks fit into and engage the grooves 63 of the loose sleeves 62' which are mounted respectively on the shafts 22 and 51. The outer end of the shaft 72 has attached thereto a crank arm 75 which crank is connected to a bell-crank lever 76 on the end of the shaft 19 by means of a link 77. Pins 78 (one only being shown) project out laterally from opposite extremities of one of the top rails 12. (See Fig. 6.) These pins are adapted to be engaged by the depending arm of the bell-crank 76, when the carriage has completed its longitudinal movement in either direction.

It will be noticed particularly from Figs. 3, 4 and 5 that the sleeves 23 surrounding the shafts 22 are provided with outstanding lugs 79, which lugs have threaded transverse apertures, through which bolts 80 pass, each bolt being threaded for the greater portion of its length, and having a head at one end, and the opposite threaded extremity carrying a nut 81. These bolts also pass through the channeled beams 14, 14. It is obvious that by loosening the nut 81 of any bolt, and then turning the head of the bolt either to the right or left, the sleeve is correspondingly turned. As the hub of the drip cup 28 is tightly clamped or secured to the sleeve 23, and inasmuch as the drip cup is provided with the arm 30 having one end provided with a bearing through which the shaft 31 passes, it is obvious that as the sleeve 23 is thus turned either to the right or left, the bearing of the arm 30 is correspondingly adjusted, and brought into proper alignment. When the desired position of the bearing is thus secured, the nut 81 is, of course, again turned up tightly against the web of the channeled beam, whereby the bearing is held secure in its adjusted position.

While I have throughout described the beams 14 as "channeled beams," yet I do not wish to be understood as limiting myself specifically to that construction, as it is obvious that the same results can be obtained by the employment of I-beams, which in practice might perhaps be preferable to channeled beams, inasmuch as they afford much greater strength laterally.

The drip cups 28 are of course adapted to catch the oil that drips from the beveled gears 33 above. The oil recesses 27 of set collars 26 also serve to catch the oil that runs down from the shaft 22.

A scraper 82 is secured to the shovel 21, and is adapted to bear against the floor and scrape the entire surface of the floor in the path of the shovel over the floor from one end of the room to the other.

The numeral 83 indicates hooks or rakes, one being secured to each shaft above its shovel 22. This hook or rake prevents the sponged grain which is elevated by the plow from being thrown up against the carriage. Inasmuch as the scraper 82 and the hook or rake 83 are fully described and shown in my pending application for Letters Patent, filed December 30, 1893, Serial No. 495,212, for improvements in malt stirring and aerating apparatuses, no further description thereof is necessary in the present application.

In the operation of my device, rotation is imparted to the sheave wheel 34 by means of the propelling cable 40. As this sheave wheel 34 and the small spur wheel 35 fast thereto, are loose on the shaft 31, motion is not imparted thereby directly to the shaft. The spur wheel 35, however, being in mesh with the larger spur wheel 37, rotation is imparted to the latter, and the smaller spur wheel 38 fast thereto. This latter wheel 38 in turn imparts rotation to the spur wheel 39 which is fast on the shaft 31. By this arrangement of alternate small and large spur wheels a reduction of speed from the cable sheave 35 to the sheave 31 is secured. As the shaft 31 is thus rotated the beveled pinions 32 thereon meshing with the beveled gears 33 of the plow shafts 22 will impart rotation to said shafts and their plows. By reason of the spiral formation of the plows, the malt is carried upward, and discharged at the top and rear of the plows. This insures the complete elevating and breaking up of the mass of the malt.

As before explained, the plow shaft 22 at the end of the machine opposite to the end where the driving mechanism is located, has its upper end extended and provided with a spur wheel 49 keyed thereon. Now, since this wheel 49 is keyed, and wheels 52, 53 and 54 are all loose, and only wheels 53 and 54 engage with the large wheel 57, it is obvious that it becomes necessary to couple the wheel 49 to either of the wheels 53 or 54. Now, if the flanged sleeve 62' of the shaft 22 is dropped, the pins 65 thereof which pass into the apertures of the wheel 49, will also pass into and engage the apertures of the flange 55 of wheel 53, and said wheel 53 being coupled to the shaft 22 its rotation will be imparted to the large wheel 57, which will have the effect of rotating shaft 58. The pinion 61 at the lower end of this shaft 58 meshes with the beveled mate 62 fixed on the end of shaft 19, thereby driving said shaft around in one direction, and as said shaft 19 carries the gear wheels 18 engaging the racks 20, it is obvious that the carriage is propelled in one direction along the track way. As soon, however, as the machine has traveled a certain distance the arm of the bell-crank lever 76 comes into contact with the obstruction or pin 78, the flanged sleeve 62' on the shaft 51 by means of the fork at one end of the arm 73 is lowered, while the corresponding sleeve on the shaft 22 is raised. By this movement the pins 65 are withdrawn from engagement with the spur wheel 53, while the pins 65 of sleeve 62' on shaft 51 will engage the spur wheel 54, and as said spur wheel 54 meshes with the wheel 57, the latter wheel and its shaft 58 will be rotated in a direction opposite to that first explained, and consequently the travel of the machine will be reversed.

As previously explained, by the arrangement of the gearing at the driving end of the machine a reduction of speed from the cable sheave 34 to the shaft 31 is secured. There is also a still further reduction from said shaft 31 to the plow shafts 22, and from the extended shaft 22 at one end of the machine to the propelling mechanism a still further reduction, by reason of the alternate arrangement of small and large gears. The reduction of speed is such that the shafts 22 turn fifteen times as fast as the driving shaft 19. By reason of this, the pressure on the pins 65 is reduced to the minimum, whereby but small power is required for throwing out of gear at the ends for the cessation of travel.

In Figs. 1 and 2, I show in connection with the machine plows or shovels similar to those described in my pending application for patent, for improvements in malt stirring and aerating apparatuses, filed December 30, 1893, Serial No. 495,212.

In Figs. 7 and 8 I show a novel form of stirring plow or helix for which I claim novelty herein. This plow is indicated by the numeral 84, and is provided with a slightly upturned outer edge 85, and an inner edge 86 upturned to a greater extent. By this construction provision is made for retaining the malt on the plow, particularly that mass of malt which is picked up off the floor. The inner portion next around the shaft it will be noticed is cut out. If this cut out portion were not provided, and the blade extended directly to the shaft, the material would not travel up, as the pitch of the screw next to the center is very great, and hence said material would have a tendency to clog, and thereby retard the upward movement of the material on that portion of the blade removed from the shaft. Besides, the material on the blade next to the shaft would be too far away from any of the material that furnishes the reaction. It follows, therefore, that if the material would not travel up the blade near the center for the reasons stated, then the central portion of the blade would only be an obstruction to the machine, and hence more power would be required to reciprocate the same. Where the blades are cut out, therefore, as shown in Figs. 7 and 8, less power is required to move the carriage over the malting floor, and at the same time the malt is turned as effectually, and in as large quantities as if the blade were extended to the shaft. The blade is narrower toward the top, for the reason that the resistance is less effective next to the top. The curved blade is fastened to an arm 87 at its lower end, which arm is fixed on the shaft as shown. The point at which the arm is fixed to the shaft is on a level or plane with the end of the blade, which is carried forward to form a hook 88, which hook materially aids in the operation of digging into the malt on the "go ahead" side of the machine.

Having thus described my invention, what I claim, and desire to secure by Letters Patent, is—

1. In a malt stirring machine, the combination, of a carriage having a segmental rack extending therefrom, a series of shafts carried thereby, said shafts provided upon their ends with malt stirring plows, and upon opposite ends with beveled gears, a shaft provided with a series of beveled pinions meshing with the gears of the plow shafts, a cable sheave mounted upon the latter shaft, an arm pivoted to the carriage, said arm provided with a dog or catch adapted to engage the segmental rack and also provided with a projecting pin, a tightener pulley journaled on said pin, and a cable running around a series of pulleys, and then extended back and forth around the cable sheave and the tightener pulley, substantially as set forth.

2. In a malt stirring machine, the combination, of rails and racks, a carriage provided with wheels traveling on the rails, said carriage also carrying rotatable plow-shafts, one of the shafts carrying a pair of spur wheels, an adjoining and engaging pair of spur wheels, a rack-shaft for the carriage provided at opposite ends with toothed wheels engaging the racks, a system of gearing between said rack-shaft and the plow-shaft carrying the spur wheels, and means in connection with the system of gearing for reversing the direction of movement of the carriage by uncoupling one pair and coupling the adjoining and engaging pair of spur wheels, substantially as set forth.

3. In a malt stirring machine, the combination, of rails and racks, a carriage provided with wheels traveling on the rails, a shaft arranged longitudinally of the carriage, and provided upon its ends with toothed wheels meshing with the racks, and also upon one end with a bell-crank lever, rotatable plow shafts carried by the carriage, one of the end plow shafts being extended, and having on its extended end a fixed and a loose spur wheel, a fixed shaft adjacent to the extended end of the plow shaft, loose spur wheels mounted thereon, sleeves slidable on the extended end of the plow shaft and the adjacent shaft, respectively, said sleeves provided with depending pins, adapted to be passed through registering apertures in the respective spur wheels, a vertical shaft provided at one end with a beveled gear meshing with a gear on the end of the shaft carrying the toothed wheels, and on its opposite end with a spur wheel which meshes with the loose spur wheel of the extended end of the plow shaft and with one of the loose spurs of the shaft adjacent, a rocking lever engaging the sleeves, a connection between the rocking lever and the bell-crank lever, and contacts at opposite ends of the room adapted to engage one arm of the bell crank lever upon the limit of travel of the carriage in either direction, substantially as set forth.

4. In a malt stirring machine, the combination, of rails and racks, a carriage provided with wheels traveling on the rails, a shaft arranged longitudinally of the carriage, and provided upon its ends with toothed wheels meshing with the racks, and also upon one end with a bell-crank lever, rotatable plow shafts carried by the carriage, one of the plow shafts being extended, and having on its extended end a fixed and a loose spur wheel, a fixed shaft adjacent to the end of the plow shaft, loose spur wheels mounted thereon, sleeves slidable on the extended end of the plow shaft and on the adjacent shaft, respectively, said sleeves provided with annular grooves and with depending pins, the latter adapted to be passed through registering apertures in the respective spur wheels, a vertical shaft provided on one end with a beveled gear meshing with a larger gear on the end of the shaft carrying the toothed wheels, and on its opposite end with a spur wheel which is larger than and meshes with the loose spur wheel on the extended end of the plow shaft, and with one of the loose spurs of the shaft adjacent, a forked rocking lever engaging the grooves of the sleeves, a connection between the rocking lever and the bell-crank lever, and contacts at opposite ends of the room adapted to engage one arm of the bell-crank lever upon the limit of travel of the carriage in either direction, substantially as set forth.

5. In a malt stirring machine, the combination, of rails and racks, a carriage traveling on the rails, and carrying rotatable plow-shafts, a shaft arranged longitudinally of the carriage and provided upon its ends with toothed wheels meshing with the racks, a vertical shaft provided on one end with a beveled gear meshing with a similar gear on the end of the shaft carrying the toothed wheel, bearings for said vertical shaft, one of the bearings provided with a cavity or oil recess, a spur wheel mounted upon this shaft, having its hub resting in the oil cavity of the bearing, a system of gearing between said spur wheel and one of the plow-shafts, a tubular arm mounted upon the upper end of the vertical shaft, and resting upon the end of the hub of the spur wheel thereon, said arm provided at its end with a bearing, and a shaft passing through the bearing and provided at its inner end with means for reversing the gearing, substantially as set forth.

6. In a malt stirring machine, the combination, of rails and racks, a carriage provided with wheels traveling on the rails, a shaft arranged longitudinally of the carriage, and provided upon its ends with toothed wheels meshing with the racks, rotatable plow shafts carried by the carriage, one of the end plow shafts being extended, and having on its extended end a fixed and a loose spur wheel, a shaft adjacent to the extended end of the plow shaft, loose spur wheels mounted thereon, sleeves slidable on the extended end of the plow shaft and the adjacent shaft, said sleeves provided with depending pins, adapted to pass through registering apertures in the respective spur wheels, a vertical shaft provided on one end with a gear meshing with a gear on the end of the shaft carrying the toothed wheels, and on its opposite end with a spur wheel which meshes with the loose spur wheel of the extended end of the plow shaft, and with one of the loose spurs of the shaft adjacent, and means for automatically actuating the sliding sleeves at the limit of movement of the carriage in either direction, whereby either the loose spur of the extended end of the plow shaft is locked to its fixed spur, or the loose spur of the adjacent shaft which is in mesh with the fixed spur of the extended end of the plow shaft, is locked to its other loose spur, substantially as set forth.

7. In a malt stirring machine, the combination, of a traveling carriage consisting of parallel beams with inwardly turned flanges, bearings arranged between said inward flanges, and plow shafts rotatable in the bearings, substantially as set forth.

8. In a malt stirring machine, the combination, of a traveling carriage, consisting of parallel beams having flanges extending inward and provided with segmental recesses, bearing sleeves arranged between the beams and seated in the recesses thereof, and plow shafts rotatable in the bearings, substantially as set forth.

9. In a malt stirring machine, the combination, of a traveling carriage consisting of parallel beams, having flanges extending inward, and provided with segmental recesses, bearing sleeves arranged between the beams, and seated in the recesses thereof, said sleeves provided with annular flanges resting upon the upper flanges of the beams and plow shafts rotatable in the bearing sleeves, substantially as set forth.

10. In a malt stirring machine, the combination, of a traveling carriage, consisting of parallel beams having flanges extending inward, and provided with segmental recesses, bearing sleeves arranged between the beams, and seated in the recesses thereof, said sleeves provided with projecting lugs having threaded apertures, and also provided with projecting bearing arms, plow shafts in the bearings, and provided on their upper ends with beveled gears, a rotatable shaft journaled in the bearing arms of the sleeves, and having a series of gears meshing with the gears of the plow shafts, and transverse threaded bolts passing through the beams and through the threaded apertures of the lugs of the sleeves, substantially as set forth.

11. In a malt stirring machine, the combination, of a traveling carriage consisting of parallel beams having flanges extending inward, bearings arranged between said beams, plow shafts rotatable in the bearings, and set collars on the plow shafts fitting and forming bearings against the ends of the sleeves, and preventing all up and down movement of the shafts, said set collars provided with end oil cavities or recesses, substantially as set forth.

12. In a malt stirring machine, the combination, of a traveling carriage consisting of parallel beams having flanges extending inward, bearing sleeves arranged between the beams, said sleeves formed with drip cups and with bearing arms, plow shafts in the bearing sleeves, said plow shafts provided with beveled gears, and a rotatable shaft journaled in the bearing arms of the sleeves, and provided with gears meshing with the gears of the plow shafts, substantially as set forth.

13. A spiral malt stirring plow or shovel having a slightly upturned outer edge and an inner edge upturned to a greater extent, substantially as set forth.

14. A spiral malt stirring plow or shovel, fixed with its lower end to its shaft, said plow or shovel consisting of a single blade extending in a spiral form by and around its shaft, and having a portion next around said shaft cut away, substantially as set forth.

15. The combination, of a rotatable shaft, a spiral plow or shovel, the lower end thereof being carried around to form a hook, the inner edge of said hook being on the same plane from the point of attachment of the plow to the shaft to the extremity of the hook, substantially as set forth.

16. In a malt stirring machine, the combination, of a rotatable shaft, a spiral plow or shovel, the lower end thereof being carried around to form a hook, and an arm extending from the shovel to the shaft, the point of its attachment to the shaft being on a level or plane with the hooked end of the blade, substantially as set forth.

In testimony whereof I affix my signature in presence of two witnesses.

JOHN F. DORNFELD.

Witnesses:
FRANK W. KIRKPATRICK,
ED. B. COLLINS.